United States Patent [19]

Suzuki et al.

[11] Patent Number: 5,016,579
[45] Date of Patent: May 21, 1991

[54] INTAKE SYSTEM FOR V TYPE ENGINE

[75] Inventors: Takamitsu Suzuki; Minoru Yonezawa, both of Iwata, Japan

[73] Assignee: Yamaha Hatsudoki Kabushiki Kaisha, Iwata, Japan

[21] Appl. No.: 481,975

[22] Filed: Feb. 16, 1990

[30] Foreign Application Priority Data

Feb. 17, 1989 [JP] Japan ............................ 1-37728
Mar. 10, 1989 [JP] Japan ............................ 1-58589
Mar. 10, 1989 [JP] Japan ............................ 1-58590

[51] Int. Cl.$^5$ ............................................ F02B 75/22
[52] U.S. Cl. ........................ 123/52 MV; 123/55 VE
[58] Field of Search ........ 123/52 M, 52 MV, 52 MC, 123/55 VF, 55 VS, 55 VE

[56] References Cited

U.S. PATENT DOCUMENTS

4,615,324 10/1986 Choushi et al. ............... 123/52 MV
4,643,138 2/1987 Ruf et al. ....................... 123/52 MV
4,649,871 3/1987 Hatamura et al. ............. 123/52 MC Primary Examiner—Noah P. Kamen
Attorney, Agent, or Firm—Ernest A. Beutler

[57] ABSTRACT

An improved induction system for a V type engine having angularly disposed cylinder banks that is comprised of a pair of plenum chambers that are disposed in side by side relationship between the cylinder banks. Intake passages extend at right angles from each plenum chamber through the other plenum chamber and serve an intake port of the opposed cylinder bank. The plenum chambers are staggered relative to each other so as to provide a void at one end of the engine in which an accessory is positioned. An intake device supplies air to the plenum chambers and it extends beneath them and is connected by fasteners which are accessible through removable covers of each of the plenum chambers.

22 Claims, 10 Drawing Sheets

INTAKE SYSTEM FOR V TYPE ENGINE

BACKGROUND OF THE INVENTION

This invention relates to an intake system for a V type engine and more particularly to an improved high efficiency and compact induction system for an engine having cylinder banks disposed at a V angle.

The advantages of V type engines are, of course, well known. Such engines generally provide a very compact arrangement. However, because of the compact nature, certain problems exist in connection with the design and construction of such engines. Particularly, if the engine is to provide a high output, it is necessary to insure that the engine has a good induction system that will permit free breathing of the engine and which can be tuned so as to achieve maximum performance. Frequently, this requires the use of plenum chambers for the engine and the positioning of the plenum chambers and associated manifolding can give rise to certain difficulties. It has been proposed, therefore, to provide the plenum chambers at a location so that they extend above the cylinder banks and then a manifolding system connects these plenum chambers with the various intake passages of the engine.

Although such arrangements permit good induction efficiency, they give rise to an increase in the overall height of the engine. In addition to adding to the height of the engine, such placement of the plenum chambers and the associated manifolding can obscure certain components of the engine. For example, it can be difficult to locate the fuel injection nozzles, spark plugs and other components without their being obscured by the induction system.

In addition to the aforenoted disadvantages, induction systems of the type previously proposed have given rise to complicated manifold passages and the difficulty in providing a low cost way of manufacturing such passages.

It is, therefore, a principal object of this invention to provide an improved induction system for a V type engine that will provide high outputs and yet will insure a compact and simple assemblage.

It is a further object of this invention to provide a high output induction system for a V type engine wherein the induction system is compact and does not obscure other components of the engine.

It is yet a further object of this invention to provide an improved induction system for a V type engine that is compact and can be made from multiple pieces which can be easily machined and connected to each other.

It is a further object of this invention to provide an improved manifold and induction system for a V type engine including pairs of plenum chambers and wherein the system facilitates a compact assembly and permits ease of placement of various accessories driven by the engine.

SUMMARY OF THE INVENTION

The invention is adapted to be embodied in an induction system for a V type engine having a pair of angularly disposed cylinder banks that define a valley therebetween. Each of the cylinder banks has a plurality of intake ports that face the valley. First and second plenum chambers extend along the length of the valley in side by side relationship with each being adjacent and spaced inwardly of a respective one of the cylinder banks. A plurality of intake passages extend from each of the plenum chambers to the intake ports of the opposed cylinder bank.

In accordance with another feature of the invention, a fuel injection system is provided for injecting fuel into the intake ports and this fuel injection system is disposed outwardly of the plenum chambers and the intake passages and between the plenum chambers and the adjacent cylinder bank.

In accordance with another feature of the invention, an induction inlet device extends beneath the plenum chambers and is connected thereto on their lower surface. As a still further feature associated with this portion of the invention, the intake device is affixed to the plenum chambers by fasteners that are contained within the plenum chambers and which are accessible by removable panels affixed to the tops of the plenum chambers.

In accordance with another feature of the invention, the intake passages each have horizontally extending portions that extend from the plenum chamber toward the opposed cylinder bank and then vertically extending portions that extend from the horizontal portions and which serve the intake ports.

In accordance with another feature, the plenum chambers are staggered along the length of the engine so as to provide a recess at one end in the valley of the engine in which an accessory driven by the engine can be mounted.

BRIEF DESCRIPTION OF THE DRAWINGS

FIG. 4 is an end elevational view of the engine from the end opposite that from which FIG. 3 is taken.

DETAILED DESCRIPTION OF THE PREFERRED EMBODIMENT OF THE INVENTION

Figure 1:
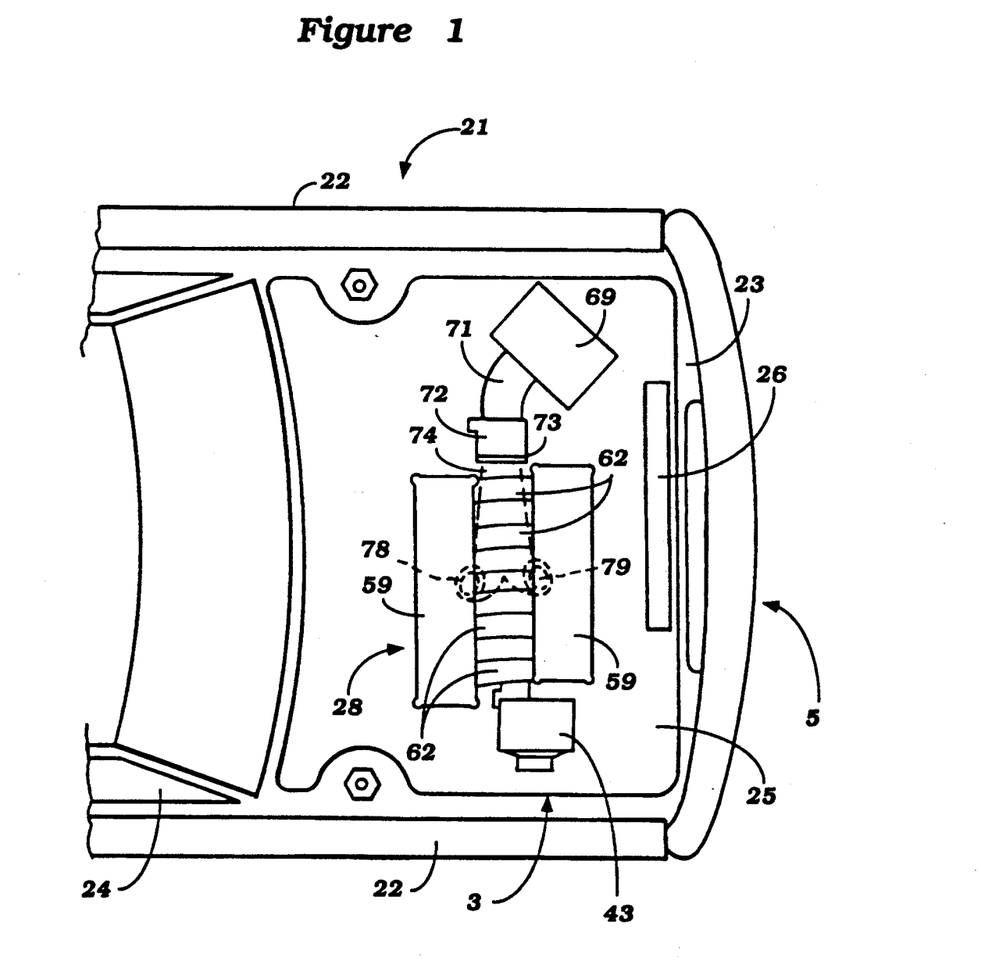
FIG. 1 is a top plan view of a portion of a motor vehicle incorporating an internal combustion engine having an induction system constructed in accordance with an embodiment of the invention. The hood has been removed to show the engine compartment and only the induction system of the engine and an accessory driven by the engine have been depicted.
Figure 2:
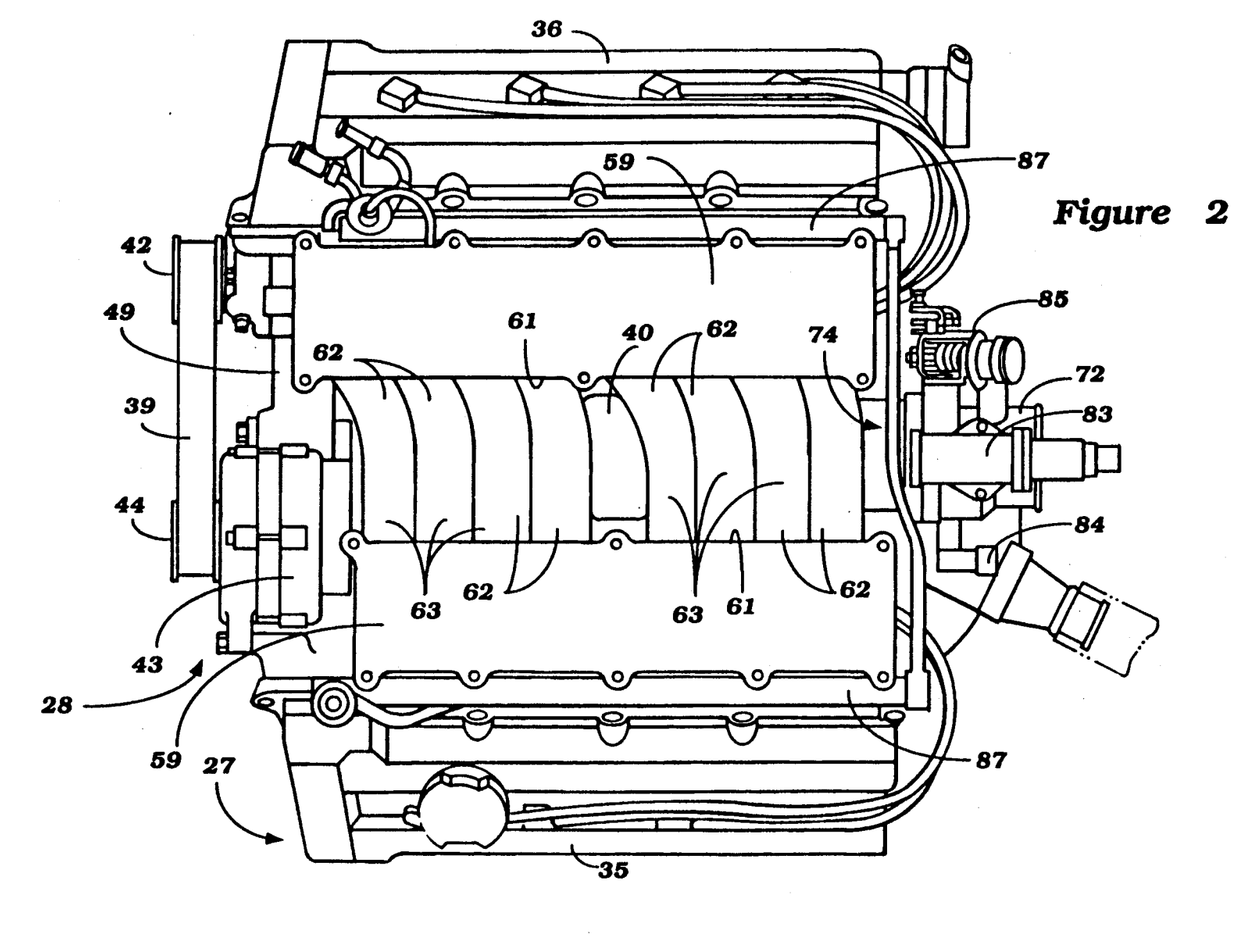
FIG. 2 is a top plan view, on an enlarged scale of the engine.
Figure 3:
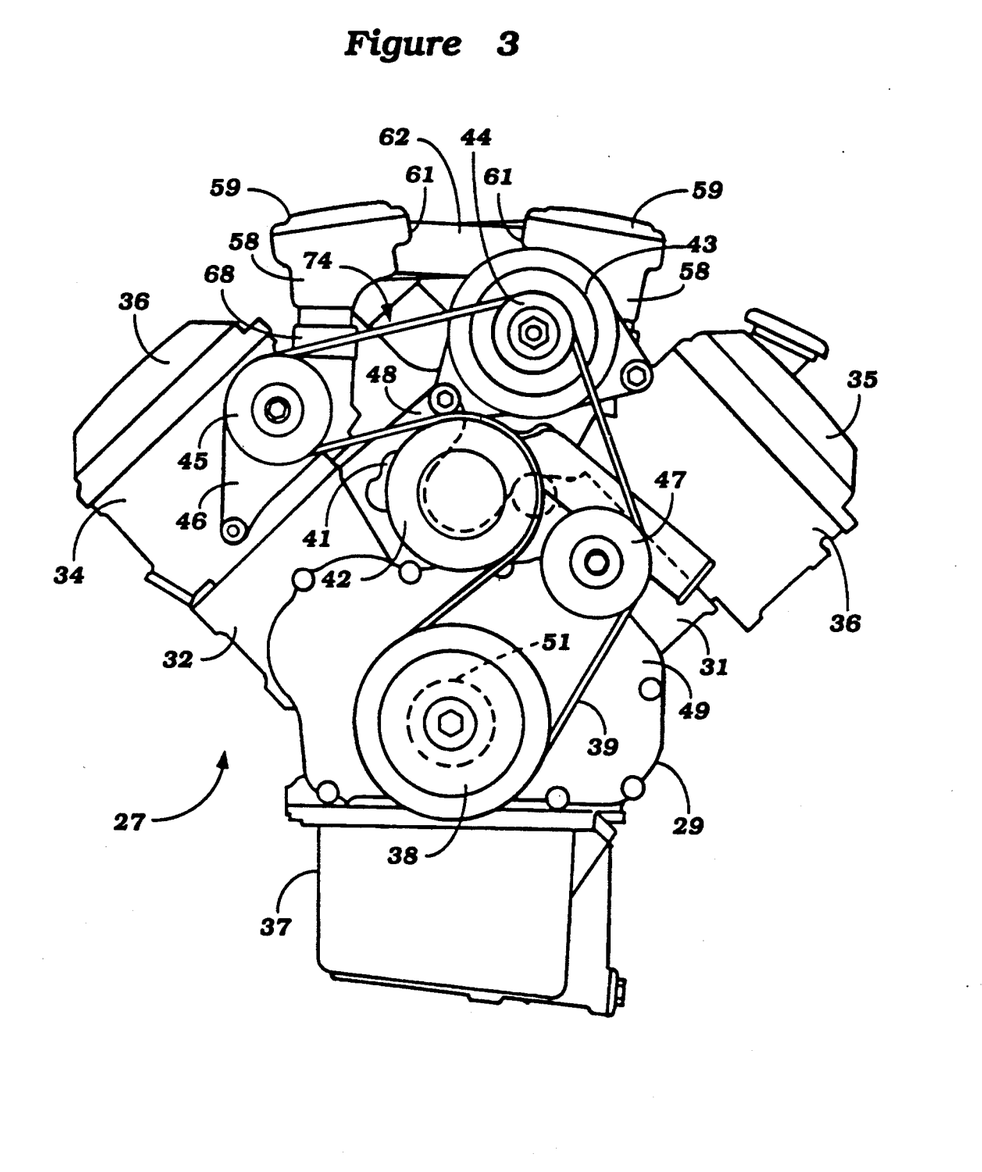
FIG. 3 is a rear elevational view of the engine looking in the direction of the arrow 3 in FIG. 1.
Figure 4:
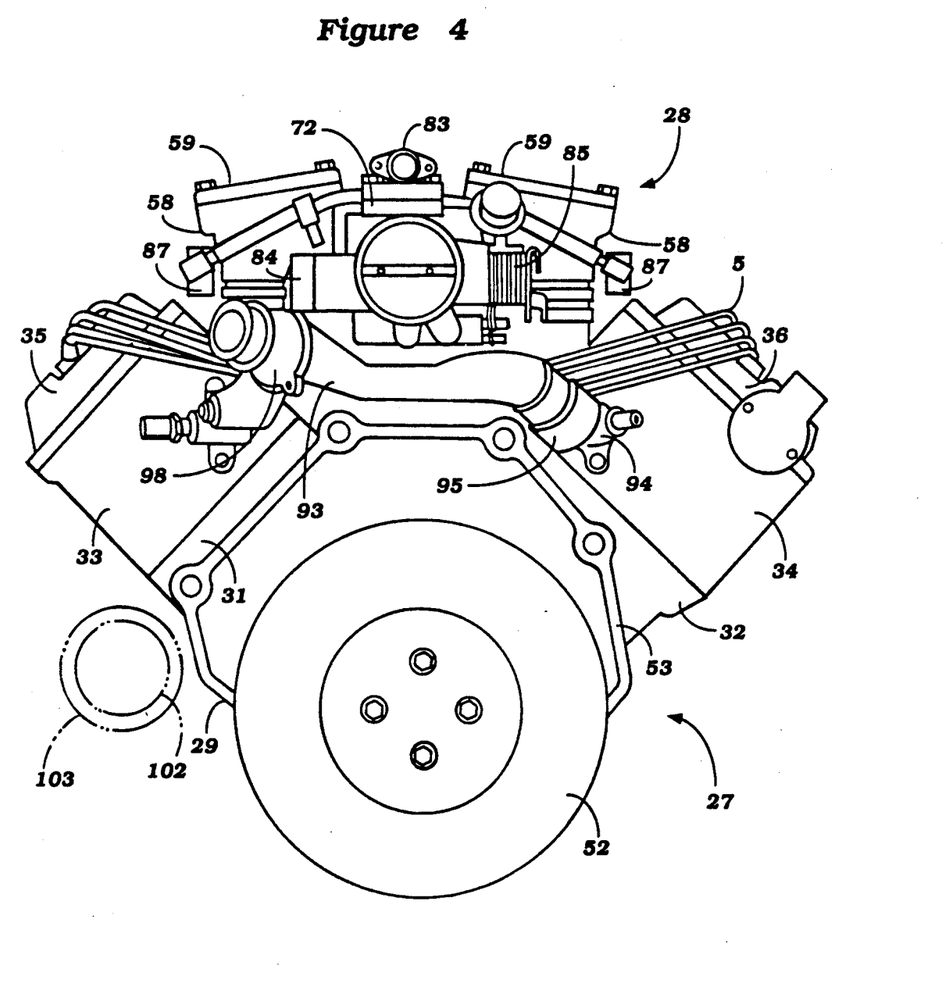
Figure 5:
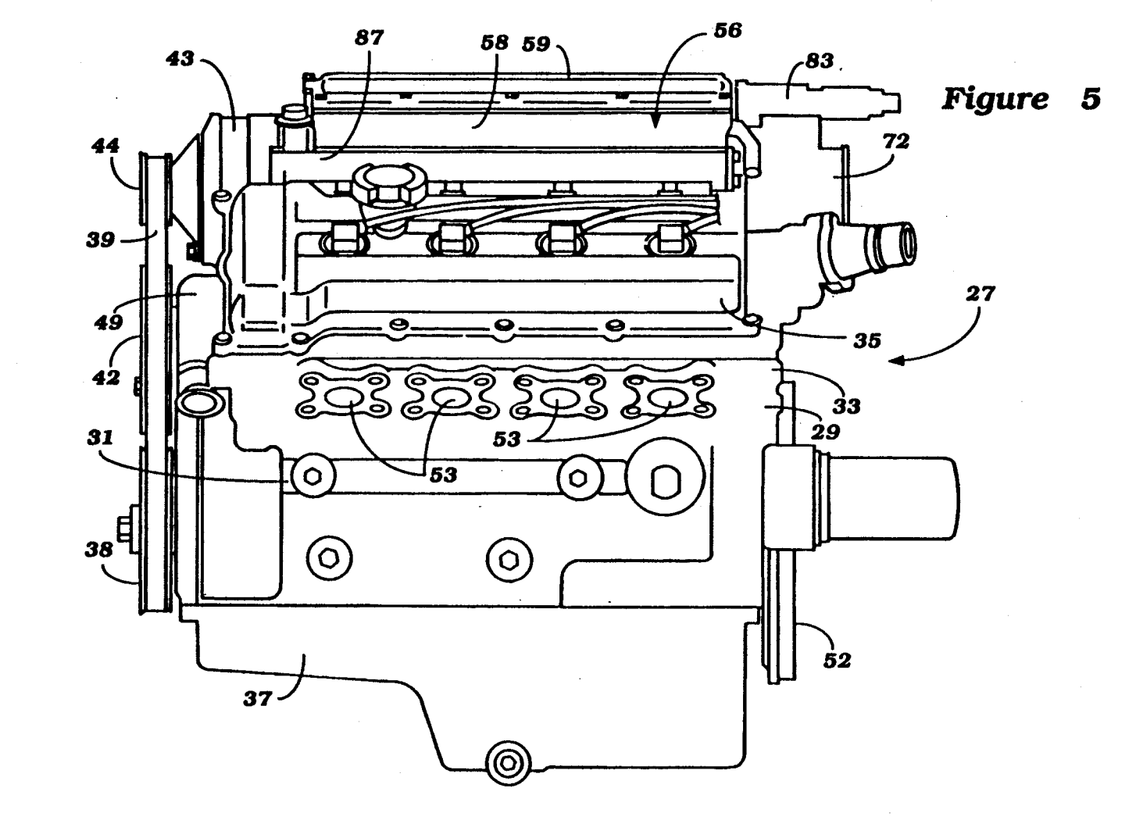
FIG. 5 is an enlarged side elevational view of the engine taken in the direction of the arrow 5 in FIG. 1.

Referring first to FIG. 1 of the drawings, a motor vehicle is shown partially and with portions removed and identified generally by the reference numeral 21. The invention is described in conjunction with a motor vehicle because the invention has particular utility in such applications wherein high power outputs and small volume requirements are essential. Of course, the invention can be utilized with a wide variety of other applications.

The motor vehicle 21 includes a pair of front fender aprons 22 and a front end 23 that are positioned forwardly of a passenger compartment 24. The toe board and fire wall of the passenger compartment 24, fender aprons 22 and front end 23 define an engine compartment, indicated generally by the reference numeral 25. A radiator 26 is positioned behind an opening in the front end 23 and cools the engine located in the engine compartment 25 in a known manner.

An internal combustion engine, indicated in the later figures generally by the reference numeral 27 and having an induction system, indicated generally by the reference numeral 28 is positioned transversely in the engine compartment 25. In FIG. 1, only the induction system 28 is illustrated and certain of the accessories driven by the engine 27. This is because the invention relates primarily to the construction of the induction system 28. The transverse engine placement is employed, as is conventional with many front engine, front wheel drive vehicles and the invention has particular utility in connection with such an environment. Of course, as has been previously noted, the invention can be utilized in conjunction with other applications for internal combustion engines and also other arrangements wherein the engine is positioned in other than a transverse location.

Referring now in detail primarily to FIGS. 2 through 5, the construction of the engine 27 will be described in more detail. The engine 27 is comprised of a cylinder block 29 that has a pair of angularly disposed cylinder banks 31 and 32. In the illustrated embodiment, the engine 27 is a V-8 and, accordingly, each of the cylinder banks 31 and 32 is provided with four cylinder bores. In the illustrated embodiment, the engine has the cylinder banks 31 and 32 disposed at a right angle or 90° relative to each other, as is typical with V-8 engine practice. As has been noted, however, the invention can be utilized in conjunction with other cylinder configurations and numbers. However, the invention relates primarily to engines having their cylinder banks disposed at a V angle and regardless of the number of cylinder bores formed therein.

Cylinder heads 33 and 34 are affixed to the cylinder banks 31 and 32 respectively in a knoWn manner. In addition, a camshaft and valve arrangement is supported in each cylinder head 33 and 34 and is enclosed by means of cam covers 35 and 36, respectively, which are affixed to the cylinder heads 33 and 34. Basically, the internal construction of the engine apart from its induction system forms no part of the invention. For that reason, these components have not been illustrated, nor is description of the them deemed necessary. Rather, it is believed that those skilled in the art can understand how the invention can be practiced with a wide variety of engine types.

The engine 27 has its crankshaft supported for rotation within a crankcase defined by the underside of the cylinder block 29 and crankcase pan 37 that is affixed to the cylinder block in a known manner. At one end of the crankshaft, a combined pulley and damper assembly 38 is affixed to the crankshaft and drives a drive belt 39 that drives a number of accessories located at this end of the engine. These accessories include a water pump 41 having a drive pulley assembly 42 that is positioned at the valley of the engine and which discharges cooling water into the cooling jacket of the engine that has been returned from the radiator 26.

Figure 9:
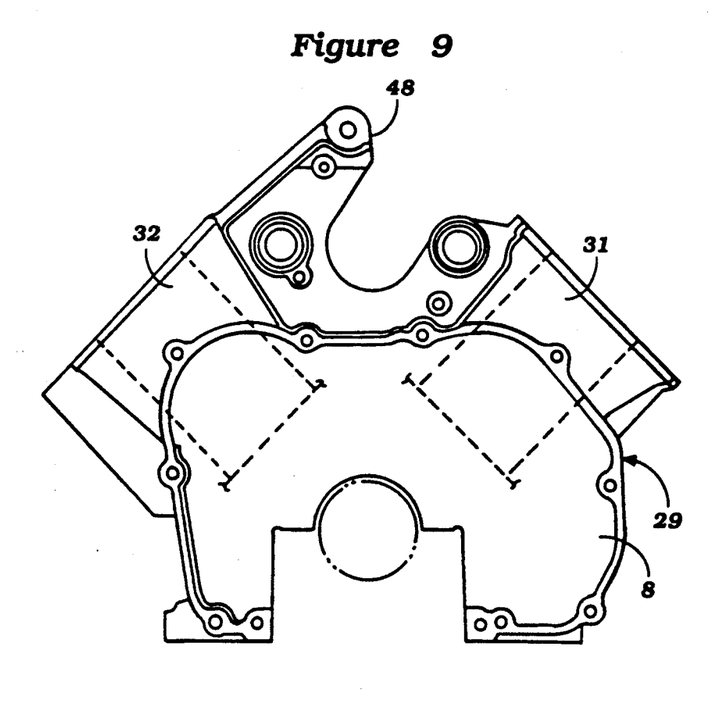
FIG. 9 is an end elevational view, taken in the same direction as FIG. 3, showing the cylinder block assembly with other components removed.

In addition, an alternator generator assembly 43 has a pulley 44 which is driven from the belt 39. As will become apparent, the alternator generator 43 is positioned in a recess formed at the end of the engine by the induction system 28 in a manner which will be described. A tensioner pulley 45 is mounted on a mounting bracket 46 at one end of the cylinder head 34 for tensioning and redirecting the drive belt 39. A further idler and tensioner pulley 47 is mounted at the corresponding end of the cylinder bank 31 for redirecting the belt 39. The water pump assembly 41 is mounted in a recessed boss 48 formed at the cylinder block assembly 29 as may be best seen in FIG. 9.

A timing chain case 49 is affixed to the end of the cylinder block assembly 29 that has been previously referred to and encloses a camshaft driving arrangement including a sprocket 51 that is affixed to the crankshaft behind the pulley and damper 38. This camshaft drive arrangement may be of any known type for example that shown in the copending application entitled "V Type Engine", Ser. No. 479,984, filed Feb. 14, 1990 and assigned to the assignee hereof.

Since the invention relates to the induction system, as heretofore noted, it is believed that the details of the construction of the camshaft drive arrangement are not necessary to understand the invention. In fact, the invention can be utilized in conjunction with engines having considerably different forms of valve train.

A flywheel 52 is affixed to the opposite end of the crankshaft from the end which has been previously referred to. This flywheel 52 is associated with a clutch mechanism or fluid clutch and transmission assembly (none of which are shown) for driving the front wheels of the motor vehicle 21 in any of the well known manners. A clutch and transmission housing assembly (not shown) is affixed to this end of the engine by means of a boss 53 that is formed on the cylinder block 29 in a known manner.

The cylinder heads 33 and 34 are formed with exhaust ports 53 (FIG. 5) that open through their outer side and which communicate with the individual cylinder bores formed therein through exhaust valves that are operated by the camshaft arrangement previously mentioned in general terms. An exhaust manifold (not shown) is affixed to the outer side of each of the cylinder heads 33 and 34 in a known manner and conveys the exhaust gases to the atmosphere through an appropriate exhaust system.

On the valley or inlet side of the cylinder heads 33 and 34, there are provided inlet ports 54 that extend upwardly and terminate in upper surfaces 55 of the respective cylinder head 33 and 34. These surfaces 55 are disposed at a right angle to each other and lie within the valley of the V. Again, the intake ports 54 communicate with the individual cylinders of the engine through intake valves in a known manner.

The foregoing description of the basic components of the engine 27 are made primarily for orientation purposes and, as has already been noted, the internal configuration and construction of the engine 27 forms no part of the invention. Rather, the invention relates to the induction system 28 which will now be described in detail by reference to all of the figures and specific reference to certain of them, as will be noted.

Figure 7:
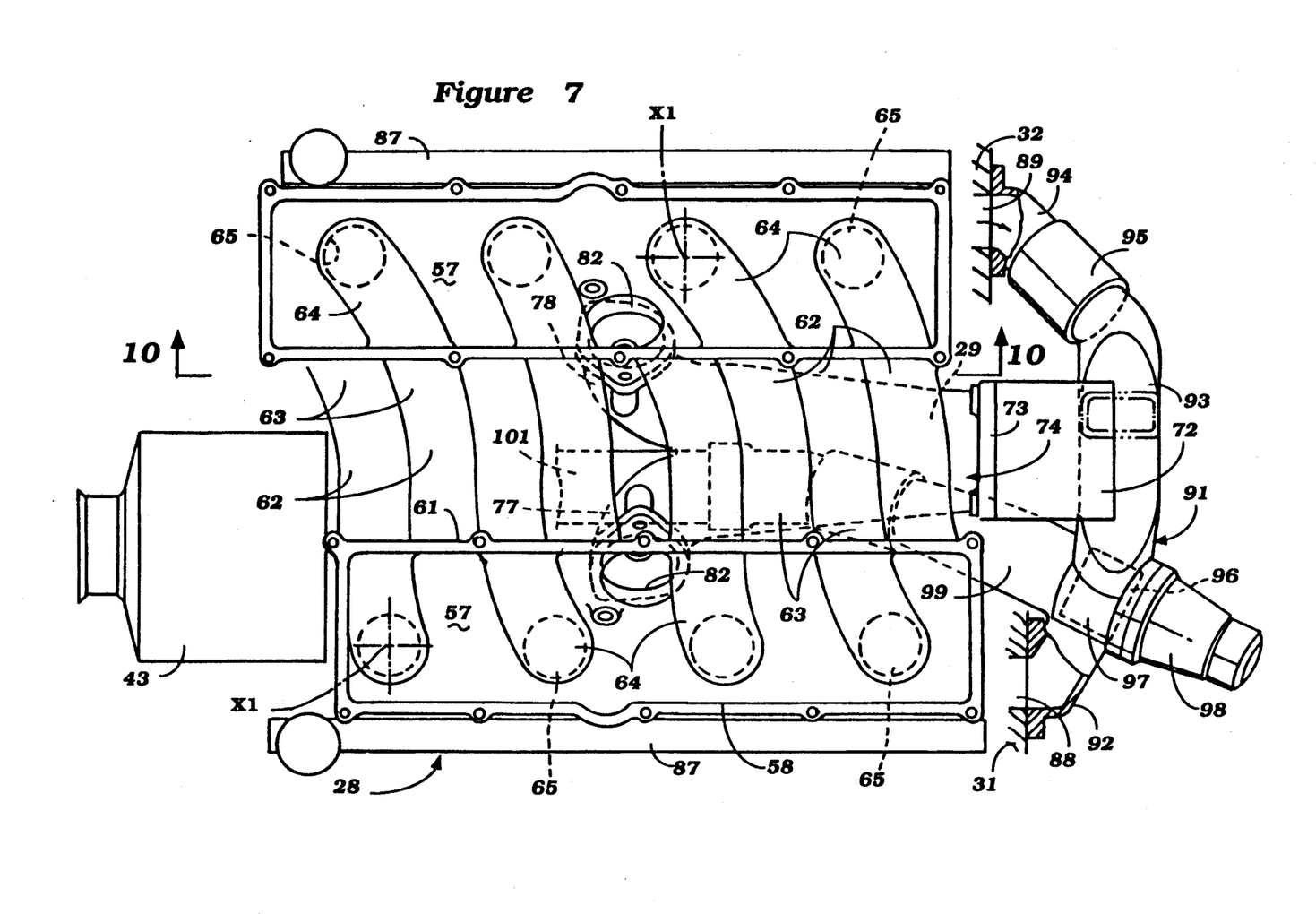
FIG. 7 is a top plan view in part similar to FIG. 2 and further enlarged therefrom showing the induction system with portions removed and also a portion of the cooling system, with a part broken away.
Figure 8:
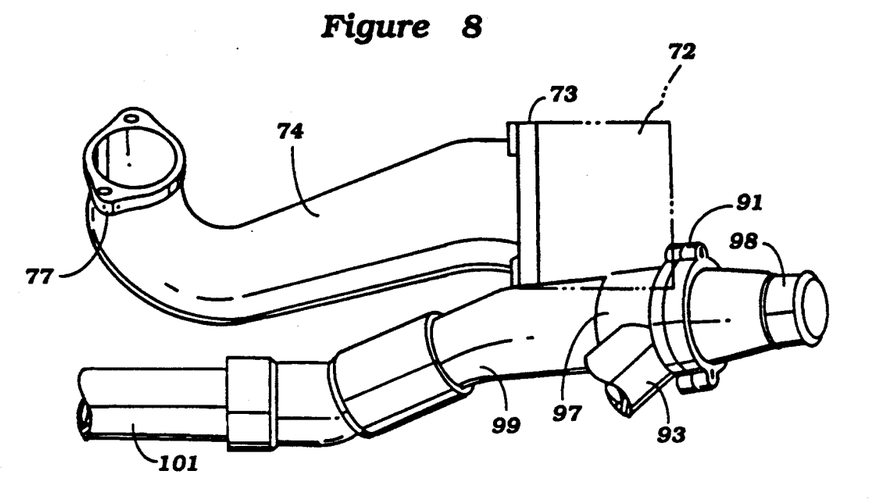
FIG. 8 is a bottom plan view showing the interrelationship of the cooling system and air inlet device.
Figure 10:
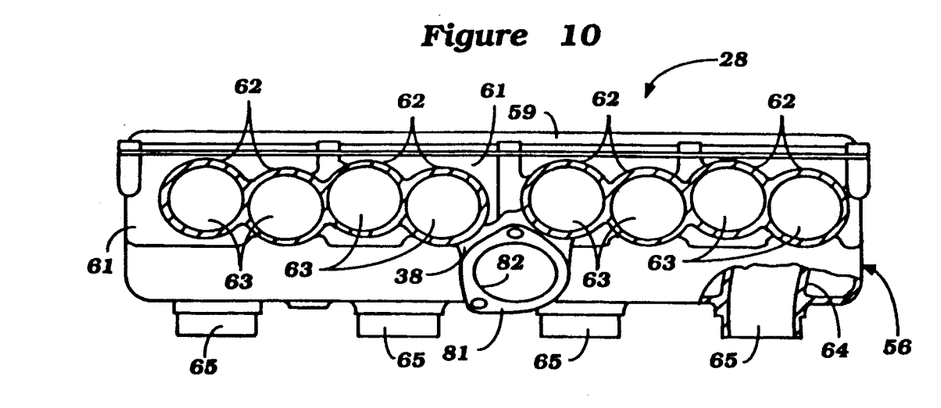
FIG. 10 is a view of one of the plenum chambers taken generally in the direction of the line 10—10 in FIG. 7.
Figure 11:
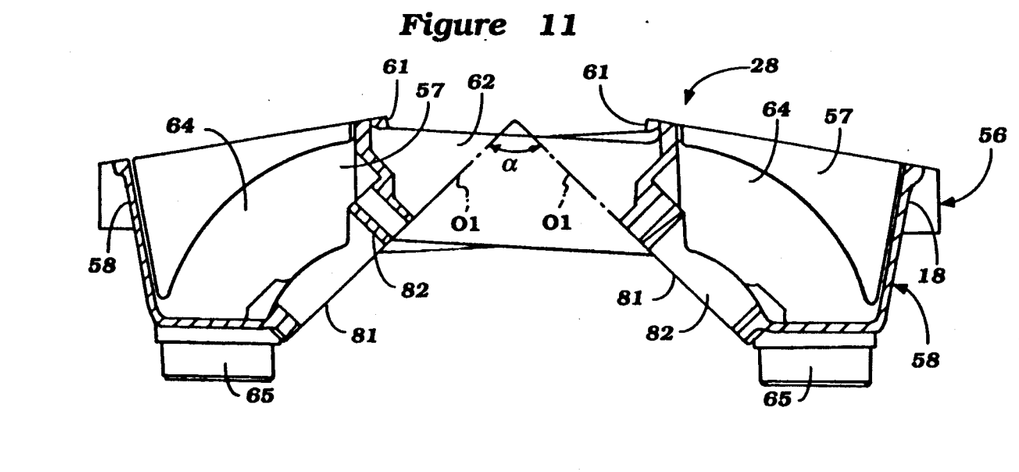
FIG. 11 is an end elevational view of the induction system with certain components removed and other components shown in cross section.

The induction system 28 is comprised of a main casting, indicated generally by the reference numeral 56 and shown in most detail in FIGS. 10 and 11. The casting 56 defines a pair of longitudinally extending plenum chambers 57 which extend along the length of the engine adjacent the intakes sides of the cylinder heads 33 and 34, respectively, and which are spaced inwardly from their outer peripheries so as to leave a gap, as will be described, therebetween. These plenum chambers 57 are defined on their outer extremity by generally vertically extending walls 58. As is typical with V engine practice, the cylinder banks 31 and 32 are staggered and the plenum chambers 57 are also staggered so as to provide a void area at one end of the engine in which the generator 43 may be nested, as clearly shown in FIG. 7. Each plenum chamber 57 is closed at its upper side by means of a cover plate 59 that is affixed thereto in a known manner.

The plenum chambers 57 are further bounded on their inner (or facing) sides by generally vertically extending walls 61. The casting 56 further provides a plurality of individual manifold runners, each indicated by the reference numeral 62 and which is comprised of a generally straight horizontally extending section 63 which extends from one of the plenum chamber walls 61 through the other of the plenum chamber walls 61 and which terminates in an arcuate section 64 formed within this other plenum chamber 57. The arcuate section 64 terminates at a downwardly extending nozzle or discharge portion 65 that extends generally vertically and which lies above a respective one of the cylinder head intake ports 54. The nozzle sections 65 are, accordingly, staggered as are the intake ports 54.

Short manifold or connector pipes 66 are affixed to the cylinder heads 33 and 34 by fasteners and have passages 67 that are aligned with the manifold passages 65. Flexible conduits 68 interconnect these passages for air flow from the plenum chambers 57 into the intake port 54 of the opposing cylinder head.

Figure 12:
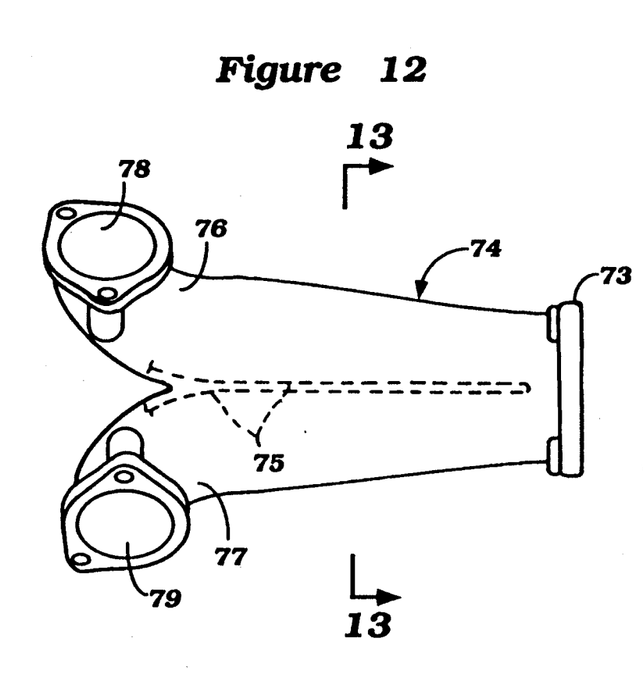
FIG. 12 is a top plan view of the intake device for the engine.
Figure 13:
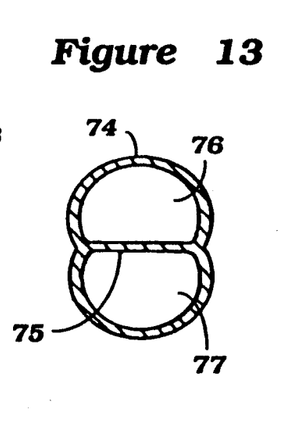
FIG. 13 is a cross sectional view taken along the line 13—13 of FIG. 12.

Air for delivery to the plenum chambers 57 is drawn from the engine compartment 25 through a combined air silencer and air cleaner 69 that is positioned at one end of the engine (FIG. 1). A connecting conduit 71 interconnects the air cleaner 69 with a throttle body 72 in which a throttle valve (not shown) is contained for controlling the engine speed. The throttle body 72 is affixed to a mounting flange 73 of an inlet collector 74. As may be best seen in FIGS. 12 and 13, the inlet collector 74 has a generally cylindrical opening at the flange 73 and then is divided by an internal dividing wall 75 into a pair of branch passages 76 and 77 so as to have a generally FIG. 8 type of shape. The branch passages 76 and 77 terminate in respective outlet flanges 78 and 79 which are disposed substantially midway of the plenum chambers 57 as may be best seen in FIG. 7.

As depicted in FIGS. 10 and 11, the manifold plenum chamber assembly 56 is provided with a pair of mounting faces 81 that, in the illustrated embodiment, are generally flat and which may be defined by planes $0_1$ that intersect at an angle $\alpha$ that is at a right angle and hence can be easily machined. Alternatively, the surfaces 81 may be curved. Inlet openings 82 are formed in the surfaces 81 and communicate with the branch outlets 78 and 79 for delivery of air to the plenum chambers 57 and for eventual distribution to the cylinder head intake ports 54 through the passages already described.

There is provided an idle speed control valve 83 (FIG. 2) that bypasses the throttle valve in the throttle body 72 for adjusting the idle speed of the engine. There is also incorporated a throttle position control sensor 84 that senses the position of the throttle valve in the throttle body 72 and provides an appropriate signal to the fuel injection control system. A return spring assembly 85 acts on the throttle valve for normally urging it to a closed position.

Figure 6:
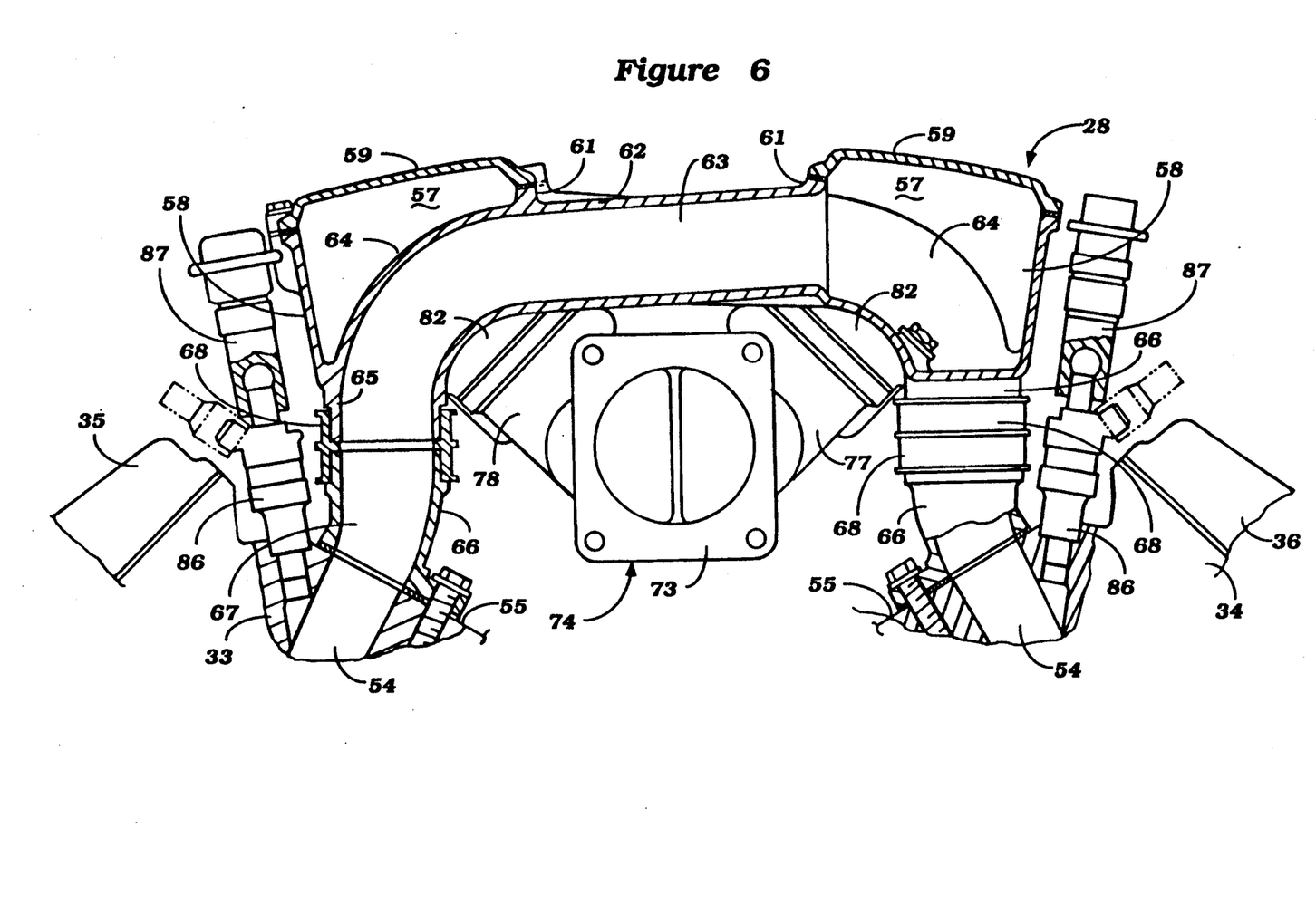
FIG. 6 is a further enlarged front elevational view of the engine, with portions broken away and shown in section and illustrating the induction system.

As may be best seen in FIG. 6, the positioning of the induction system 28 is such that there is adequate room for fuel injection nozzles 86 to be mounted into the cylinder heads 33 and 34 in the area between the connector pipe 66 and the cam covers 35 and 36. These injection nozzles 86 extend upwardly and receive fuel from fuel rails 87 that extend along the length of the engine at each side thereof. Fuel is delivered to these fuel rails 87 from an appropriate pressure source and the fuel injection system may be of any known type. For this reason, further description and illustration of it is believed to be unnecessary.

As has been previously noted, water is delivered from the radiator 26 to the cooling jacket of the engine at the accessory drive end from the water pump 41. This coolant is then returned back to the radiator through a pair of return passageways 88 and 89 that are formed in the rear face of the cylinder banks 31 and 32, respectively. A return fitting assembly, indicated generally by the reference numeral 91 has a first branch passageway 92 that communicates directly with the water outlet 88 and a second branch passageway 93 that communicates with a fitting 94 affixed to the water outlet 89 via a hose 95.

It should be noted that the passageways 92 and 93 begin with a cylindrical configuration and this configuration changes into a flattened rectangle under the throttle body 72 for clearance purposes. A thermostatic valve 96 is provided in a valve housing 97 formed by the assembly 91. This controls the flow of return water to the radiator through a water return 98. In addition, a bypass line 99 extends from the housing 91 and communicates with a bypass conduit 101 that extends to the other end of the engine for bypassing fluid when the thermostatic valve 96 is closed. The engine is also provided with an oil filter 102 (FIG. 4) that is surrounded by an oil cooler 103.

It should be readily apparent from the foregoing description that the described engine construction provides a very compact induction system and yet one which provides a pair of plenum chambers for the engine so as to improve its induction efficiency. This is achieved in a very compact way without adversely effecting the performance of the engine and without interfering with the placement of the various components for the engine. Of course, the foregoing description is that of a preferred embodiment of the invention. It should be obvious that various changes and modifications may be made without departing from the spirit and scope of the invention, as defined by the appended claims.

We claim:

1. An induction system for a V type of engine having a pair of angularly disposed cylinder banks defining a valley therebetween, each of said cylinder banks having a plurality of intake ports facing said valley, first and second plenum chambers extending along the length of said valley in side by side relationship, each being adjacent and spaced inwardly of a respective one of said cylinder banks, and a plurality of intake passages extending from a side of each of said plenum chambers generally facing the opposed cylinder bank to the intake ports of the opposed cylinder bank.

2. An induction system as set forth in claim 1 wherein each of the intake passages includes a horizontally extending section extending from one plenum chamber to the other plenum chamber, a curved portion extending through the other plenum chamber and a vertically extending portion extending from the other plenum chamber to the intake port of the opposed cylinder bank.

3. An induction system as set forth in claim 2 further including a flexible connector interconnecting the vertically extending portion to the respective cylinder bank.

4. An induction system as set forth in claim 3 further including air inlet means extending beneath the intake passages for delivering air to the plenum chambers at substantially their midpoints.

5. An induction system as set forth in claim 4 further including an air inlet in said air inlet means at one end of said engine and throttle valve means in said air inlet for controlling the speed of said engine.

6. An induction system as set forth in claim 5 wherein the inlet means is affixed to the plenum chambers by threaded fasteners.

7. An induction system as set forth in claim 6 wherein the threaded fasteners are accessible from internally of the plenum chambers by providing removable covers for each of the plenum chambers.

8. An induction system as set forth in claim 6 wherein the surfaces of the plenum chamber to which the inlet device is affixed extend at right angles to each other.

9. An induction system as set forth in claim 8 wherein the threaded fasteners are accessible from internally of the plenum chambers by providing removable covers for each of the plenum chambers.

10. An induction system as set forth in claim 3 wherein the cylinder banks are staggered relative to each other and the plenum chambers are staggered to provide a void at one end of the engine in the valley thereof.

11. An induction system as set forth in claim 10 further including an accessory driven by the engine and positioned in the void.

12. An induction system as set forth in claim 11 wherein a series of fuel injection nozzles deliver an intake charge to the intake ports, said fuel injection nozzles being positioned between the plenum chamber and the respective cylinder bank.

13. An induction system as set forth in claim 1 further including air inlet means extending beneath the intake passages for delivering air to the plenum chambers at substantially their midpoints.

14. An induction system as set forth in claim 13 further including an air inlet in said air inlet means at one end of said engine and throttle valve means in said air inlet for controlling the speed of said engine.

15. An induction system as set forth in claim 14 wherein the inlet means is affixed to the plenum chambers by threaded fasteners.

16. An induction system as set forth in claim 15 wherein the threaded fasteners are accessible from internally of the plenum chambers by providing removable covers for each of the plenum chambers.

17. An induction system as set forth in claim 15 wherein the surfaces of the plenum chamber to which the inlet device is affixed extend at right angles to each other.

18. An induction system as set forth in claim 17 wherein the threaded fasteners are accessible from internally of the plenum chambers by providing removable covers for each of the plenum chambers.

19. An induction system as set forth in claim 1 wherein the cylinder banks are staggered relative to each other and the plenum chambers are staggered to provide a void at one end of the engine in the valley thereof.

20. An induction system as set forth in claim 19 further including an accessory driven by the engine and positioned in the void.

21. An induction system as set forth in claim 20 wherein a series of fuel injection nozzles deliver an intake charge to the intake ports, said fuel injection nozzles being positioned between the plenum chamber and the respective cylinder bank.

22. An induction system as set forth in claim 1 wherein a series of fuel injection nozzles deliver an intake charge to the intake ports, said fuel injection nozzles being positioned between the plenum chamber and the respective cylinder bank.

* * * * *